United States Patent
Liu et al.

(10) Patent No.: US 11,983,547 B2
(45) Date of Patent: May 14, 2024

(54) SORTING OPTIMIZATION BASED ON USER'S TIME PREFERENCES AND HABITS

(71) Applicant: Citrix Systems, Inc., Fort Lauderdale, FL (US)

(72) Inventors: Xin Liu, Nanjing (CN); Yimin Liu, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 405 days.

(21) Appl. No.: 17/323,678

(22) Filed: May 18, 2021

(65) Prior Publication Data

US 2022/0326966 A1   Oct. 13, 2022

Related U.S. Application Data

(63) Continuation of application No. PCT/CN2021/085855, filed on Apr. 8, 2021.

(51) Int. Cl.
*G06F 9/445* (2018.01)

(52) U.S. Cl.
CPC ........ *G06F 9/44578* (2013.01); *G06F 9/4451* (2013.01); *G06F 9/44521* (2013.01)

(58) Field of Classification Search
CPC ............... G06F 9/44578; G06F 9/4451; G06F 9/44521; G06F 11/3409; G06F 2201/865; G06F 2201/88; G06F 9/445; G06F 11/302

See application file for complete search history.

(56) References Cited

U.S. PATENT DOCUMENTS

| | | | |
|---|---|---|---|
| 10,108,791 B1 * | 10/2018 | Masterman | G06F 21/316 |
| 10,178,067 B1 | 1/2019 | Kumar et al. | |
| 10,621,337 B1 | 4/2020 | Sharabani et al. | |
| 2004/0054715 A1 | 3/2004 | Cesario | |
| 2005/0188079 A1 | 8/2005 | Motsinger et al. | |
| 2006/0026509 A1 | 2/2006 | Porter | |
| 2009/0070457 A1 | 3/2009 | Mckinney | |
| 2011/0154109 A1 | 6/2011 | Levine et al. | |

(Continued)

FOREIGN PATENT DOCUMENTS

| | | |
|---|---|---|
| CN | 106293309 A | 1/2017 |
| CN | 108874264 A | 11/2018 |

(Continued)

OTHER PUBLICATIONS

Non-Final Office Action on U.S. Appl. No. 16/806,092 dated Jun. 24, 2021.

(Continued)

*Primary Examiner* — Quazi Farooqui

(57) ABSTRACT

System and methods discussed for automatically optimizing application and notification delivery based on user preferences and historical application usage. Applications that a user is likely to want to use at the present time or in the near future are displayed in an organizationally distinct way in an application catalog so they are easy to find and are preloaded on an application delivery server so they are available with minimal system lag caused by application loading processes. Application notifications are also optimized such that notifications that are likely to be relevant to users at the current time are identified and presented to them in an organizationally distinct way.

17 Claims, 8 Drawing Sheets

(56) References Cited

U.S. PATENT DOCUMENTS

| | | |
|---|---|---|
| 2011/0295995 A1 | 12/2011 | Diao et al. |
| 2012/0089726 A1* | 4/2012 | Doddavula ............ H04L 67/34 709/224 |
| 2012/0324556 A1 | 12/2012 | Yefimov et al. |
| 2014/0026115 A1 | 1/2014 | Bank et al. |
| 2016/0381204 A1* | 12/2016 | Chandrasekaran ..... G06F 9/451 715/745 |
| 2017/0104787 A1 | 4/2017 | Myron |
| 2017/0160881 A1 | 6/2017 | Kanemoto |
| 2017/0353565 A1 | 12/2017 | Kumar et al. |
| 2017/0372334 A1 | 12/2017 | Shafique et al. |
| 2018/0189101 A1 | 7/2018 | Xu et al. |
| 2018/0219923 A1 | 8/2018 | Berger et al. |
| 2021/0303597 A1* | 9/2021 | Zhang ................... G06F 16/275 |
| 2021/0409235 A1* | 12/2021 | Cui ....................... H04L 12/189 |

FOREIGN PATENT DOCUMENTS

| | | |
|---|---|---|
| CN | 109614022 A | 4/2019 |
| WO | WO-2016/183936 A1 | 11/2016 |
| WO | WO-2020/133418 A1 | 7/2020 |

OTHER PUBLICATIONS

Notice of Allowance for U.S. Appl. No. 16/148,591, dated Nov. 12, 2019.

International Search Report on PCT Appl. No. PCT/CN2021/085855 dated Jan. 10, 2022.

Notice of Allowance on U.S. Appl. No. 16/806,092 dated Jul. 20, 2022.

Final Office Action on U.S. Appl. No. 16/806,092 dated Oct. 5, 2021.

* cited by examiner

| Time Interval | User Action | System Action |
|---|---|---|
| T0 | | System is Idle |
| T1 | User clicks on desired application to open it | |
| T2 | User waits for application to load | System loads application binary into memory |
| T3 | User waits for application to load | System loads app resources into memory |
| T4 | | System displays application to user |
| T5 | User uses application | |

*FIG. 4A*

| Time Interval | User Action | System Action |
|---|---|---|
| T0 | | System pre-loads user's desired application |
| T1 | User clicks on desired application to open it | |
| T2 | | System displays application to user |
| T3 | User uses application | |

*FIG. 4B*

| |
|---|
| User ID 601 |
| Application ID 602 |
| Application Type 603 |
| Open Timestamp 604 |
| Close Timestamp 605 |
| Time Zone 606 |
| Running Application List 607 |
| ○○○ |
| Additional metadata 608 |

*FIG. 6*

SORTING OPTIMIZATION BASED ON USER'S TIME PREFERENCES AND HABITS

CROSS-REFERENCE TO RELATED APPLICATIONS

This application is a continuation of, and claims priority to and the benefit of International Patent Application No. PCT/CN2021/085855, titled "SORTING OPTIMIZATION BASED ON USER'S TIME PREFERENCES AND HABITS", and filed on Apr. 8, 2021, the entire contents of which are hereby incorporated herein by references in its entirety for all purposes.

FIELD OF THE DISCLOSURE

The present application generally relates to optimizing information and application prioritization.

BACKGROUND OF THE DISCLOSURE

In many organizations, computer users regularly use certain applications during certain time periods. For example, a manager might check in with their team on Slack, provided by Slack Technologies of San Francisco, California, every weekday morning around 9:00 am, check information on Jira, provided by Atlassian Corporation Plc of Australia, every weekday morning around 9:30 am, and approve expense reimbursement requests using Concur Expense, provided by Concur Technologies, Inc. of Bellevue, Washington, every Wednesday at 1:00 pm. Users waste time looking for the applications they want to use in their system application catalog and waiting for the application to load on their computer. Additional time is wasted searching through notifications and alerts for those that are relevant and most useful at a given time. In virtualized or managed computing environments, network bottlenecks and server lag can occur when many users request applications around the same time, such as the start of the business day or after a lunch break.

BRIEF SUMMARY OF THE DISCLOSURE

The system and methods discussed herein provide for automatically optimizing application and notification delivery based on user preferences and historical application usage. Applications that a user is likely to want to use at the present time or in the near future may be displayed in an organizationally distinct way in an application catalog so they are easy to find and may be pre-loaded on an application delivery server so they may be available with minimal system lag caused by application loading processes. Application notifications may be optimized such that notifications that are likely to be relevant to users at the current time are identified and presented to them in an organizationally distinct way.

In one aspect, the present disclosure is directed to a method for optimized application prioritization. The method includes receiving, by a computing device, historical usage information of a user of a plurality of applications, the historical usage information comprising a plurality of usage characteristics for each application of the plurality of applications. The method also includes selecting, by the computing device, a subset of the plurality of applications according to a filter policy and a present time period. The method also includes sorting, by the computing device, each application of the selected subset in order based on the plurality of usage characteristics for the corresponding application and the present time period; and providing, by the computing device, a user interface comprising one or more elements corresponding to each application of the selected subset in the sorted order.

In some implementation, the method further includes measuring the plurality of usage characteristics for an application by tracking, during access to the application, utilization of a processor and a memory device of a computing device associated with the user.

In some implementations, the method further includes launching a first application having a highest corresponding priority score of the scores of the applications of the selected subset, prior to receipt of a request to launch the first application from the user. In a further implementation, the method includes launching a second application having a second highest corresponding priority score of the scores of the applications of the selected subset, prior to receipt of a request to launch the first application from the user, the second application configured to execute at a lower priority than the first application.

In some implementations, the plurality of usage characteristics includes an average frequency of access of the corresponding application; an average duration of access of the corresponding application; and an average order of access of the corresponding application relative to other applications.

In some implementations, the plurality of usage characteristics includes usage characteristics for a predetermined time period corresponding to the present time period.

In some implementations, selecting the subset of the plurality of applications further includes excluding one or more applications of the plurality of applications from the subset, responsive to the filter policy indicating that the one or more applications are unavailable for access during the present time period.

In some implementations, the method further includes determining, by the computing device, a priority score for each application of the selected subset, the priority score for each application based on the plurality of usage characteristics for the corresponding application and the present time period. In a further such implementation, sorting each application of the selected subset further comprises sorting each application of the selected subset in order according to the corresponding priority score for the application. In another further such implementation, the priority score for each application includes a weighted sum of values of the plurality of usage characteristics for the corresponding application and the present time period.

In some implementations, providing the user interface further includes providing a plurality of notifications in the sorted order, each notification of the plurality of notifications corresponding to a different application of the selected subset. In some implementations, the one or more elements corresponding to each application comprise notifications.

In another aspect, the present disclosure is directed to a system for optimized application prioritization. The system includes a computing device comprising a memory device storing historical usage information of a user of a plurality of applications, the historical usage information including a plurality of usage characteristics for each application of the plurality of applications, and a processor executing an application prioritization service. The application prioritization service is configured to select a subset of the plurality of applications according to a filter policy and a present time period. The application prioritization service is also configured to sort each application of the selected subset in order based on the plurality of usage characteristics for the corresponding application and the present time period, and provide a user interface comprising one or more elements corresponding to each application of the selected subset in the sorted order.

In some implementations, the plurality of usage characteristics include an average frequency of access of the corresponding application; an average duration of access of the corresponding application; and an average order of access of the corresponding application relative to other applications.

In some implementations, the plurality of usage characteristics include usage characteristics for a predetermined time period corresponding to the present time period.

In some implementations, the application prioritization service is further configured to measure the plurality of usage characteristics for an application by tracking, during access to the application, utilization of a processor and a memory device of a computing device associated with the user.

In some implementations, the application prioritization service is further configured to exclude one or more applications of the plurality of applications from the subset, responsive to the filter policy indicating that the one or more applications are unavailable for access during the present time period.

In some implementations, the application prioritization service is further configured to determine a priority score for each application of the selected subset, the priority score for each application based on the plurality of usage characteristics for the corresponding application and the present time period. In a further such implementation, sorting each application of the selected subset further comprises sorting each application of the selected subset in order according to the corresponding priority score for the application. In some implementations, the priority score for each application comprises a weighted sum of values of the plurality of usage characteristics for the corresponding application and the present time period.

In some implementations, the application prioritization service is further configured to provide a plurality of notifications in the sorted order, each notification of the plurality of notifications corresponding to a different application of the selected subset. In some implementations, the one or more elements corresponding to each application comprise notifications.

In some implementations, the application prioritization service is further configured to launch a first application having a highest corresponding priority score of the scores of the applications of the selected subset, prior to receipt of a request to launch the first application from the user. In a further implementation, the application prioritization service is further configured to launch a second application having a second highest corresponding priority score of the scores of the applications of the selected subset, prior to receipt of a request to launch the first application from the user, the second application configured to execute at a lower priority than the first application.

In still another aspect, the present disclosure is directed to a non-transitory computer readable medium comprising instructions that, when executed by a processor of a computing device, cause the computing device to perform operations including receiving historical usage information of a user of a plurality of applications, the historical usage information comprising a plurality of usage characteristics for each application of the plurality of applications. Execution of the instructions further causes the computer to perform operations including selecting a subset of the plurality of applications according to a filter policy and a present time period. Execution of the instructions further causes the computer to perform operations including sorting each application of the selected subset in order based on the plurality of usage characteristics for the corresponding application and the present time period, and providing a user interface comprising one or more elements corresponding to each application of the selected subset in the sorted order.

In some implementations, the medium further comprises instructions that, when executed by the processor of the device, cause the computing device to determine a priority score for each application of the selected subset, the priority score for each application based on the plurality of usage characteristics for the corresponding application and the present time period; and launch a first application having a highest corresponding priority score of the scores of the applications of the selected subset, prior to receipt of a request to launch the first application from the user.

The details of various embodiments are set forth in the accompanying drawings and the description below.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIG. 4A is a table depicting the actions taken by a user and a typical system at incremental time intervals;

FIG. 4B is a table depicting the actions taken by a user and an optimized system at incremental time intervals, according to some implementations;

FIG. 6 is a table depicting some of the information gathered about an application used by a user, according to some implementations;

Figure 1:
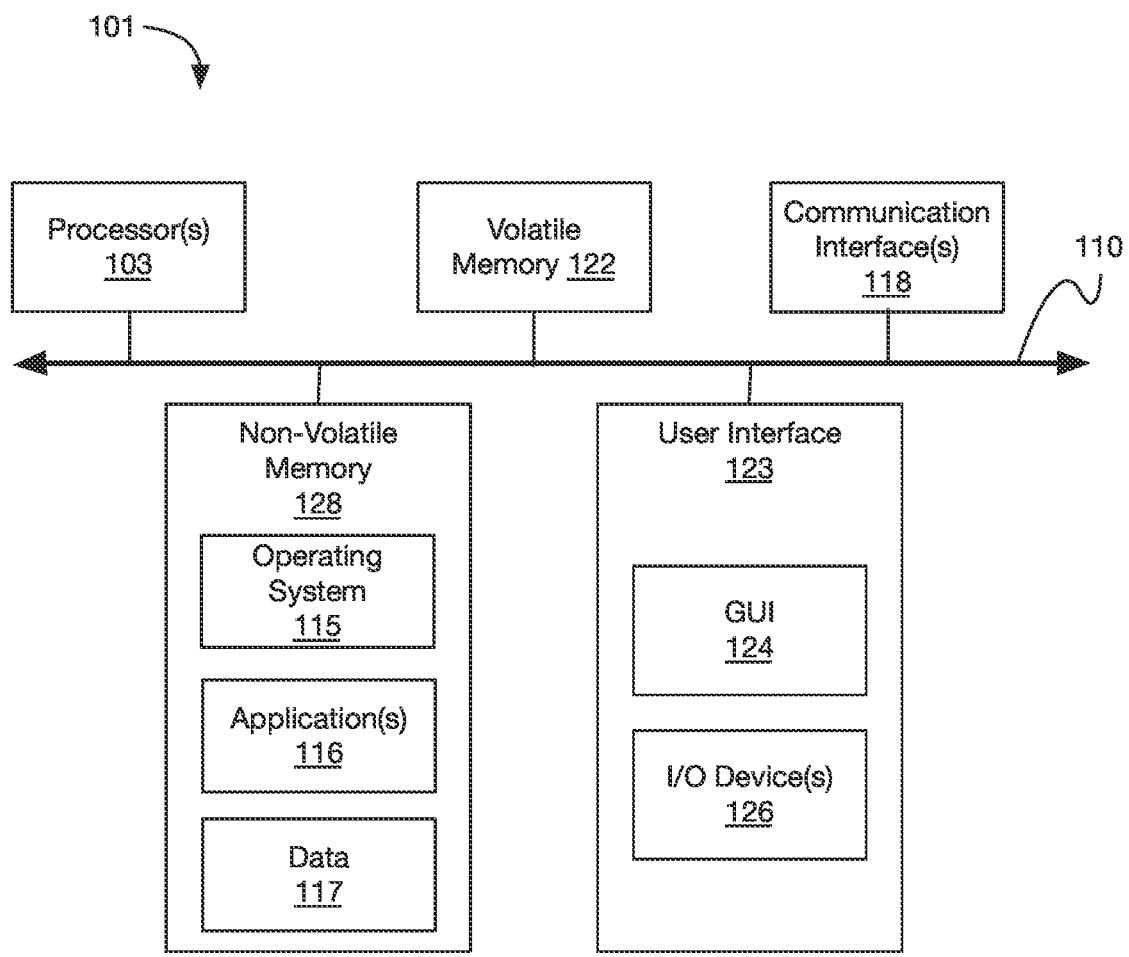
FIG. 1 is a block diagram illustrating an implementation of a computing device for use with the systems and methods discussed herein.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein; and Section B describes embodiments of systems and methods for application delivery optimization.

A. Computing Environment

Prior to discussing the specifics of embodiments of the systems and methods for automatically optimizing application and notification delivery based on user preferences and historical application usage, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O devices(s) 126. Various elements of computer 101 may communicate via one or more communication buses, shown in communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" a be embodied in one or more application specific integrated circuits (ASICs), microprocessors, digital signal processors (DSPs) graphics processing units (GPUs), microcontrollers, field programmable gate arrays (FPGAs), programmable logic arrays (PLAs), multi-core processors, or general-purpose computers with associated memory. The "processor" may be analog, digital, or mixed-signal. In some embodiments, the "processor" may be one or more physical processors or one or more "virtual" (e.g., remotely located or "cloud") processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop including one or more of: one or more applications, one or more desktop applications, and one or more desktop sessions in which one or more applications may execute.

B. Systems and Methods for Application Delivery Optimization

In many organizations, computer users regularly use certain applications during certain time periods. For example, a manager might check in with their team on Slack, provided by Slack Technologies of San Francisco, California, every weekday morning around 9:00 am, check information on Jira, provided by Atlassian Corporation Plc of Australia, every weekday morning around 9:30 am, and approve expense reimbursement requests using Concur Expense, provided by Concur Technologies, Inc. of Bellevue, Washington, every Wednesday at 1:00 pm. Users waste time looking for the applications they want to use in their system application catalog.

Figure 2A:
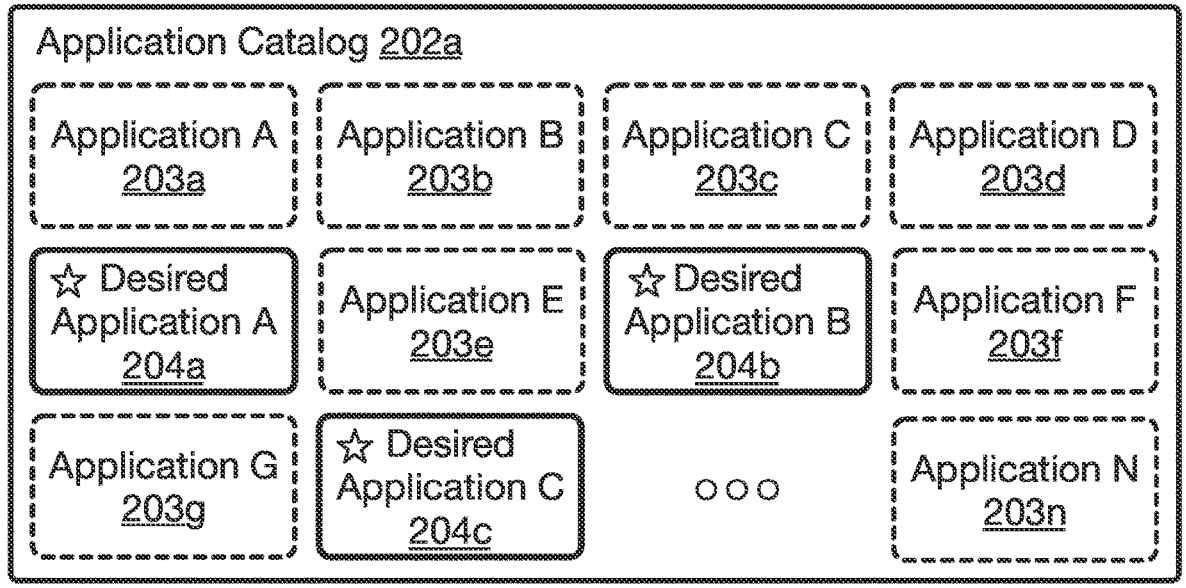
FIG. 2A is an illustration of an example of a typical application catalog.

For example, FIG. 2A is an illustration of a typical application catalog 202a, depicting a plurality of applications available to a user. Applications may be presented to the user as text, as icons which are part of a GUI, or a combination of text and icons. Applications may be presented to the user randomly or in an order such as alphabetically by application name, alphabetically by manufacturer name, category, size, date of last use, or order of installation onto the system. The order in which applications are presented to the user may change in response to various events including when the computer is restarted, when updates are performed, when a new application is installed, and when one or more applications are removed. In some implementations, the application catalog 202a may be part of the operating system, or in other implementations, the application catalog 202a may be part of an application or system for delivery of virtualized applications.

Users may have to spend time searching for the application or applications they wish to use at a given time. For example, if a user wishes to open three desired applications, desired application A 204a, desired application B 204b, and desired application C 204c, they will have to search among the entire application catalog 202a including undesired applications application A 203a through application N 203n. This may be a cumbersome and time-consuming process. In instances where many applications are available to the user, this may cause user frustration. Further, if the order of applications changes, users may experience frustration as they are no longer able to locate the application in the location where it previously was located and must search for it anew.

The systems and methods discussed herein provide for prioritizing applications based on a user's time preference and habits so the applications a user is likely to want to use at a given time are presented to the user in an intuitive way that eliminates the need for the user to search through an application catalog. An application sorting engine may retrieve historical usage information of a user of a plurality of applications and identify the application or applications the user is most likely to want to use at the present time or in the near future. Applications may then be displayed to the user in an intuitive way, making them easy to find and reducing user frustration and waste of time.

Figure 2B:
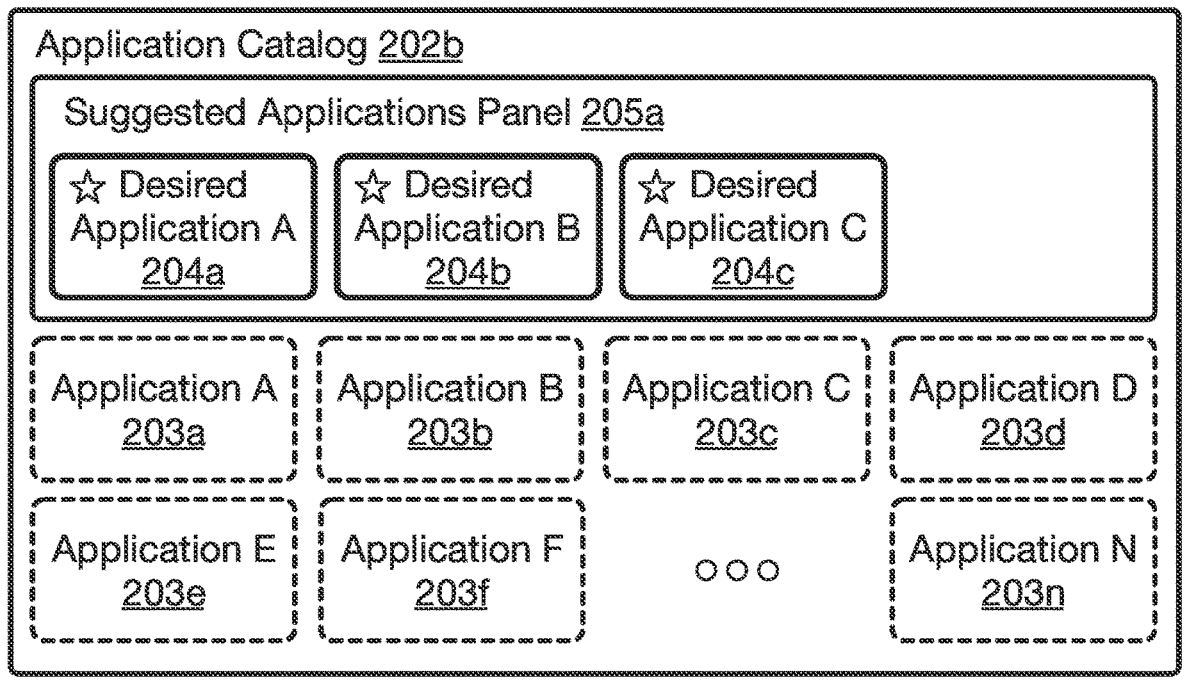
FIG. 2B is an illustration of an example of an optimized application catalog, according to some implementations.

FIG. 2B is an illustration of an example optimized application catalog 202b, according to some implementations. Applications may be presented to the user as text, as icons which are part of a GUI, or a combination of text and icons. In some implementations, the application catalog 202a may be part of the operating system, or in other implementations, the application catalog 202a may be part of an application or system for delivery of virtualized or managed applications.

In many implementations, application catalog 202b may present the applications a user is likely to want to use at the present time and/or in the near future, for example, desired application A 204a, desired application B 204b, and/or desired application C 204c, in an organizationally distinct way from undesired applications application A 203a through application N 203n. This may be done by displaying the desired applications at the top of the application catalog 202b.

In many implementations, the desired applications will be displayed according to how soon they are likely to be desired by the user. For example, desired application A 204a may be displayed first, as it is likely the user will want to use this application at the present time. Desired application B 204b may be displayed second, as it is likely the user will want to use this application in the near future. Desired application C 204c may be displayed third, as it is likely the user will want to use this application in the near future, but after opening desired application B 204b.

In some implementations, application catalog 202b may include a suggested applications panel 205a, which may be displayed as a pop-up, overlay, highlighted or colored area, box, pane, window, alert, or part of a search result screen or interface. It may also be displayed as a list of text. In many implementations, suggested applications panel 205a will contain applications a user is likely to want to use at the current time. In some implementations, suggested applications panel 205a will contain applications a user is likely to want to use at a time in the near future.

In some implementations, application catalog 202b may have an application search functionality. A user may be able to type part or all of a name or description of an application into the application search function. The results of the application search may display the applications a user is likely to want to use at that time, such as desired application A 204a, desired application B 204b, and/or desired application C 204c, in addition to the result based on the query entered into the search functionality.

In some implementations, applications that are not likely to be desired at the present time or in the near future, such as application A 203a through application N 203n may be presented to the user randomly or in an order such as alphabetically by application name, alphabetically by manufacturer name, category, size, date of last use, or order of installation onto the system. In some implementations, applications that are not likely to be desired at the present time or in the near future may be hidden from view.

Figure 3A:
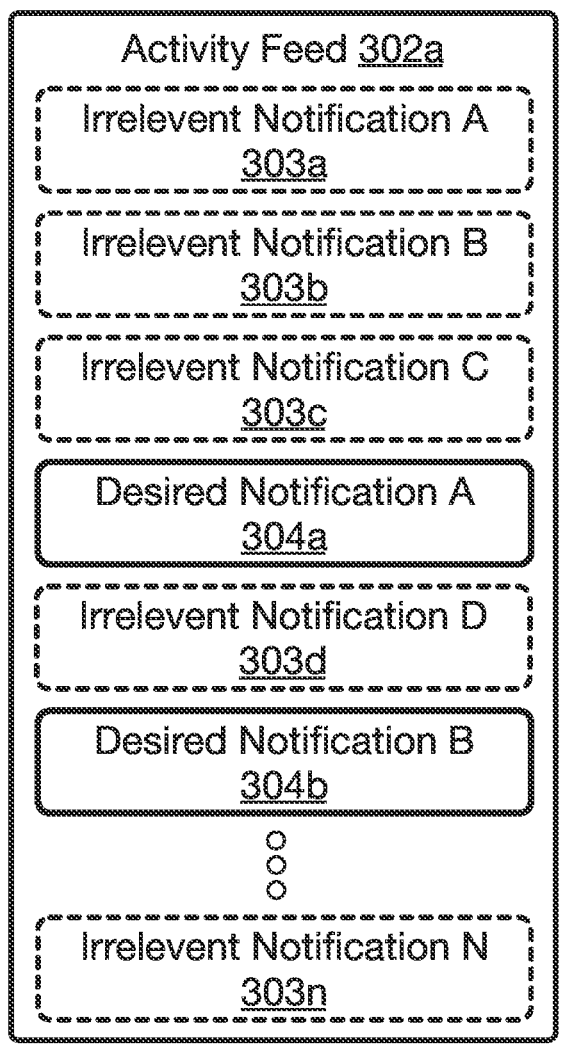
FIG. 3A is an illustration of an example of a typical activity feed.

Additional time is wasted when users must search through notifications and alerts for those that are relevant and most useful at a given time. For example, FIG. 3A is an illustration of an example of a typical activity feed. In some implementations, the activity feed 302a may be part of the operating system, or in other implementations, the activity feed 302a may be part of an application or system for delivery of virtualized or managed applications. The activity feed 320a may be displayed as a pop-up, overlay, highlighted or colored area, box, pane, window, alert, or part of a search result screen or interface. It may also be displayed as a list of text.

The activity feed 302a contains a plurality of notifications. Notifications may consist of factual information, alerts, insights, predictions, warnings, tasks, actions, and/or error information. Notifications may contain text, buttons, links, data input fields, graphics, animations, audio, and/or video. The user may have an option to remove or dismiss notifications from the activity feed singularly, in groups, or all at once. There may be a plurality of desired notifications, such as desired notification A 304a and desired notification B 304b, which may provide the user useful or desired information at the current time. There may also be a plurality of notifications that are not relevant to the user at the current time, such as irrelevant notification A 303a through irrelevant notification N 303n. Notifications may be displayed chronologically and/or in groups. The user may have to waste time looking through irrelevant notification A 303a through irrelevant notification N 303n to find relevant or desired notifications for the current time. The user may experience frustration looking through large numbers of notifications for notifications that are relevant or desired. The user may accidentally miss the notifications that are relevant or desired when looking through the activity feed 302a. The user may experience fatigue when looking through the contents of activity feed 302a and give up looking, causing them to miss notifications that are relevant or desired at the current time. The user may experience fatigue or frustration when looking through the contents of activity feed 302a and dismiss one or more notifications without looking at them, which could include notifications that are relevant or desired at the current time.

Figure 3B:
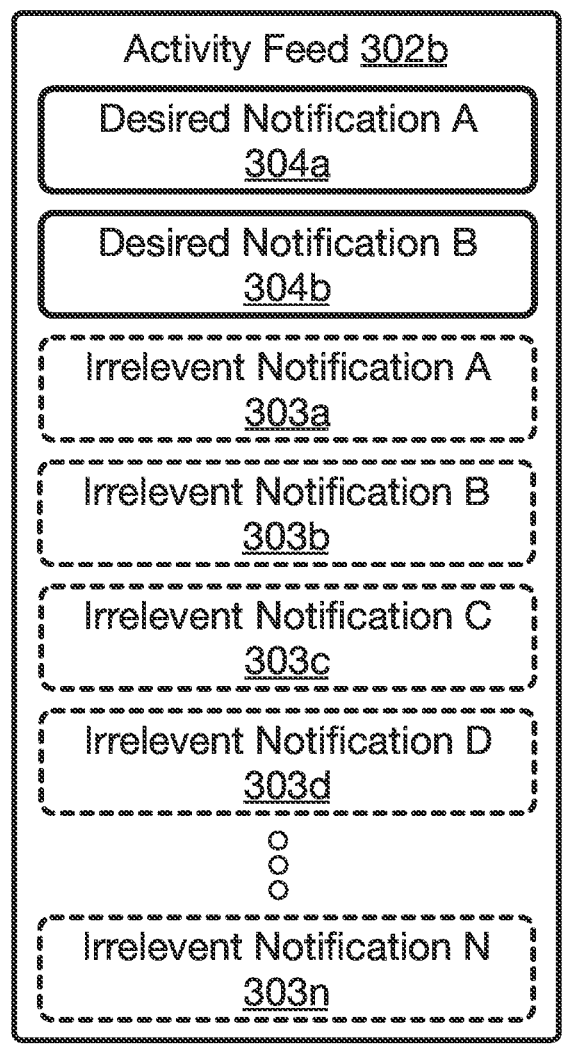
FIG. 3B is an illustration of an example of an optimized activity feed, according to some implementations.

FIG. 3B is an illustration of an example of an optimized activity feed, according to some implementations. In some implementations, the activity feed 302b may be part of the operating system, or in other implementations, the activity feed 302b may be part of an application or system for delivery of virtualized or managed applications. The activity feed 302b may be displayed as a pop-up, overlay, highlighted or colored area, box, pane, window, alert, or part of a search result screen or interface. It may also be displayed as a list of text.

The activity feed 302b contains a plurality of notifications. Notifications may consist of factual information, alerts, insights, predictions, warnings, tasks, actions, and/or error information. Notifications may contain text, buttons, links, data input fields, graphics, animations, audio, and/or video. The user may have an option to remove or dismiss notifications from the activity feed singularly, in groups, or all at once. There may be a plurality of desired notifications, such as desired notification A 304a and desired notification B 304b, which may provide the user useful or desired information at the current time. There may also be a plurality of notifications that are not relevant to the user at the current time, such as irrelevant notification A 303a through irrelevant notification N 303n.

In many implementations, activity feed 302b may present the notifications a user is likely to want or need to see at the present time and/or in the near future, such as desired notification A 304a and desired notification B 304b, in an organizationally distinct way from undesired or irrelevant notifications such as irrelevant notification A 303a through irrelevant notification N 303n. This may be done by displaying the desired notifications at the top of the activity feed 302b.

In many implementations, the desired notifications will be displayed according to how likely they are to be desired by the user and/or how soon they are likely to be desired by the user. For example, desired notification A 304a may be displayed first, as it is highly likely the user will want to see this notification at the present time. Desired notification B 304b may be displayed second, as it is likely the user will want to see this notification at the present time, but slightly less likely than desired notification A 304a. Desired notification C 304c may be displayed third, as it is likely the user will want to see this notification at the present time, but slightly less likely than desired notification C 304c.

In some implementations, users may be able to set preferences regarding which notifications are desirable or relevant for certain time periods or generally, by category, type, or other attribute. Users may also be able to set preferences regarding which notifications are irrelevant or undesired for certain time periods or generally, by category, type, or other attribute. In some implementations, the relevance or desirability of notifications may be determined based on a historical record of user interaction with the activity feed 302b. In many implementations, the relevance of a notification may be determined based on a relevancy score, which may be calculated based on numerous factors.

For example, in some implementations, the relevance or desirability of notifications may be determined based on the applications a user is likely to want to use at the present time and/or in the near future, for example, desired application A 204a, desired application B 204b, and/or desired application C 204c. In many implementations, a relevance score for a notification may be affected by, but not solely determined by, the applications a user is likely to want to use at the present time and/or in the near future, for example, desired application A 204a, desired application B 204b, and/or desired application C 204c. In some implementations, desired and/or relevant notifications may be displayed in groups. Undesired or irrelevant notifications may be displayed chronologically and/or in groups, in an organizationally distinct way from desired and/or relevant notifications, such as below the desired and/or relevant notifications or in a separate group from the desired and/or relevant notifications.

Users further waste time waiting for the application to load on their computer. For example, FIG. 4A is a table depicting the actions taken by a user and a typical system at incremental time intervals. In a typical system, at time interval T0 before the user makes a request for an application, the system is idle. At time interval T1, when a user wants to open a desired application, they may click on an icon for the application or otherwise send a command to the system requesting the application. At time interval T2, the system receives and processes the user's request for the application. This may include locating the requested application binary or script in a storage system and loading it into memory. The user must wait for this process to complete, which may lead to user frustration. At time interval T3, the system may load application resources into memory, such as importing external libraries, requesting data from APIs, loading and running scripts, and/or fetching data from a database. The user must wait for this process to complete, which may lead to user frustration. At time interval T4, the system displays the application to the user. This may consist of delivering the application across a network and/or displaying the application on a screen. At time interval T5 the user may start to interact with or use the application.

The user waiting that may occur at time interval T3 and/or time interval T4 may lead to user confusion. Due to the waiting time, the user may be uncertain if the system has properly received the request to open the application. The user may click on the application again and/or otherwise issue subsequent requests to open the desired application. This may lead to degradation of system performance, as the system may then fully or partially open multiple instances of an application in response to the requests from the user, all of which require system resources.

FIG. 4B is a table depicting the actions taken by a user and an optimized system at incremental time intervals, according to some implementations. In some implementations, at time interval T0 before the user makes a request for an application, the system will pre-load an application most likely to be desired and/or requested by the user at the next time interval T1. For example, the system may pre-load desired application A 204a at time interval T0. At time interval T1 when the user clicks on or otherwise issues a command to the system requesting desired application A 204a, the system displays the application to the user. The application is already pre-loaded so the user does not have to wait for the system to load the application binary or script or its associated resources such as external libraries, data from APIs, scripts, and/or data from a database.

In some implementations, at time interval T0 before the user makes a request for an application, the system will pre-load a plurality of applications most likely to be desired and/or requested by the user at the next time interval T1. For example, the system may pre-load desired application A 204a, desired application B 204b, and/or desired application C 204c at time interval T0. At time interval T1 when the user clicks on or otherwise issues a command to the system requesting desired application A 204a, desired application B 204b, and/or desired application C 204c, the system displays the requested applications to the user. The applications are already pre-loaded so the user does not have to wait for the system to load the application binaries or scripts or their associated resources such as external libraries, data from APIs, scripts, and/or data from a database.

In some implementations, the system may take system resources into account when preloading applications and only pre-load applications that are not likely to degrade the performance of the system. In some implementations, the system may always pre-load specified applications, and only preload others according to available system resources. In some implementations, the system may take into account the applications likely to be requested by all of the system users or a subset of the system users at the next time interval and stagger pre-loading of the applications to lower the resource impact on the system. In some implementations, a user may be able to set preferences regarding which applications to always pre-load, never pre-load, pre-load according to a schedule, or pre-load in response to a defined condition, action, or trigger.

Figure 5:
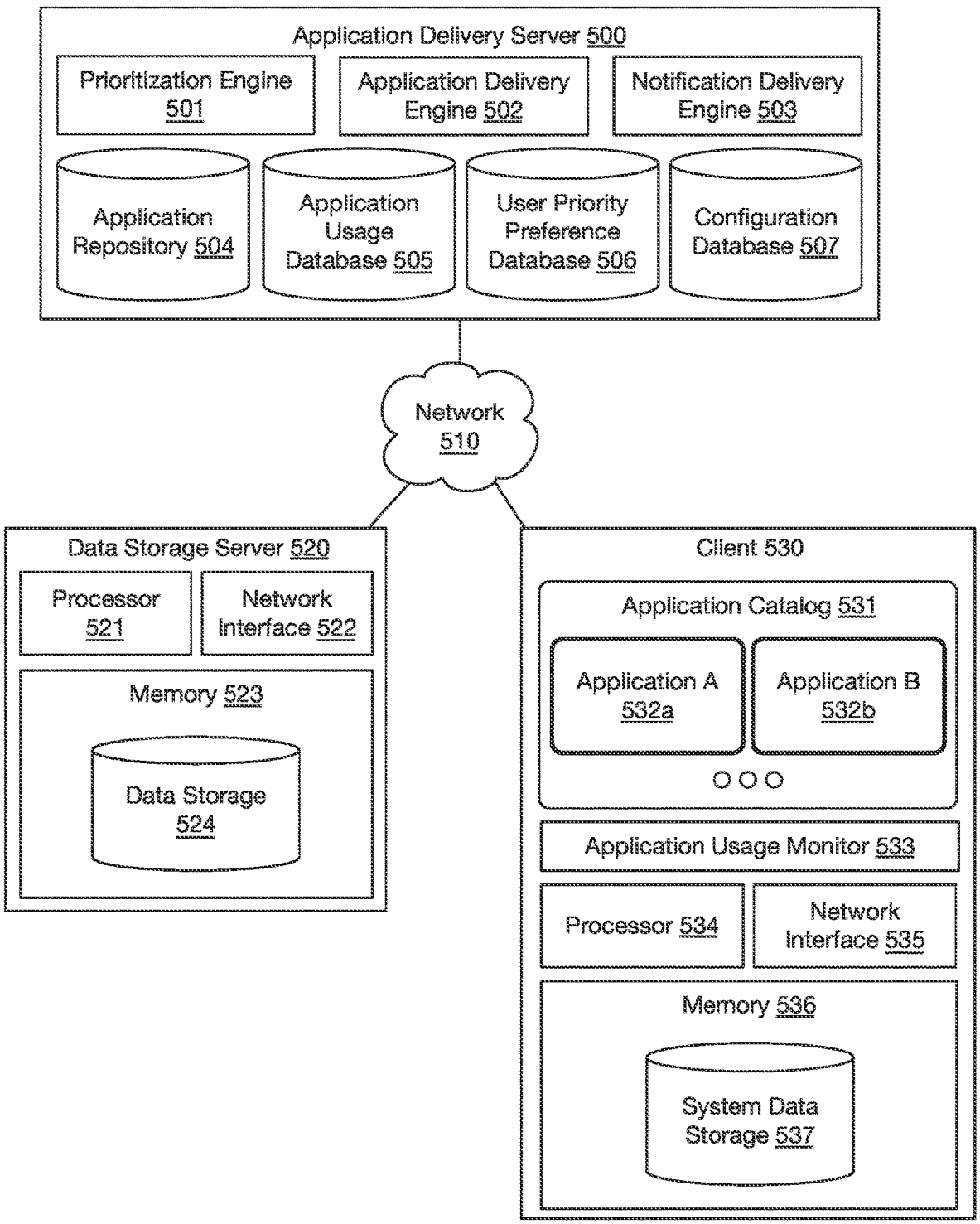
FIG. 5 is a block diagram of an implementation of a system for optimization of application delivery based on user's time preferences and habits.

FIG. 5 is a block diagram of an implementation of a system for optimization of application delivery based on user's time preferences and habits. A client 530, sometimes referred to as a user device, client device, or by other such terms, may communicate with an application delivery server 500, sometimes referred to as an application server, a virtualization server, application database, or by other such terms, via a network 510. A client 530 may communicate with a data storage server 520, sometimes referred to as a data server, database, network attached storage, network storage server, or by other such terms, via a network 510. An application delivery server 500 may communicate with a data storage server 520 via a network 510. Although only one client 530, one data storage server 520, and one application delivery server 500 are illustrated, in many implementations, multiple clients 530, multiple data storage servers 520, and/or multiple application delivery servers 500, may communicate with each other via one or more networks 510.

Client 530 may comprise a laptop computer, desktop computer, tablet computer, wearable computer, smart phone, console, smart television, embedded computer, workstation, or any other type and form of computing device. In some implementations, client 530 may comprise a virtual machine executed by one or more hardware machines and communicating with another computing device for display to a user (e.g. via a remote desktop protocol). Client 530 may be any type of device 101 discussed above, and may comprise one or more processors 534 (which may be similar to processors 103 discussed above); network interfaces 535 (which may be similar to communications interfaces 118 discussed above); and memory devices 536 (which may be similar to memory 122, 128 discussed above).

Memory 536 may include system data storage 537. System data storage 537 may store operating system data, application data, and/or user data. Although shown on client 530, in some implementations, system data storage 537 may be located on another device or other devices, such as one or more data storage servers 520 or one or more application delivery servers 500 and accessed through one or more networks 510.

In some implementations, application usage monitor 533 may collect at least the data elements listed in FIG. 6, discussed below, such as user ID 601, application ID 602, application type 603, open timestamp 604, close timestamp 605, time zone 606, running application list 607, and additional metadata 608. In some implementations, application usage monitor 533 may collect a subset of the data elements listed in FIG. 6. Although shown on client 530, in some implementations, application usage monitor 533 may be located on another device such as application delivery server 500.

In some implementations, application usage monitor 533 may consist of a web browser plugin, an agent that monitors API calls to certain system libraries and/or remote APIs including RESTful APIs, or an agent that monitors system processes. In some implementations, application usage monitor 533 may be a standalone application. In some implementations, application usage monitor 533 may be integrated into another application. In most implementations, data collected by application usage monitor 533 is stored in application usage database 505.

Client 530 may have an application catalog 531 (which may be similar to application catalog 202b, discussed above). In most implementations, application catalog 531 will contain a plurality of applications available to a user, such as application A 532a and application B 532b. Applications available to the user in the application catalog, such as application A 532a and application B 532b, may be applications desired by the user at the present or in the near future (which may be similar to desired application A 204a thru desired application C 204c, discussed above) and/or applications not desired by the user at the present or in the near future (which may be similar to application A 203a through application N 203n, discussed above). The applications available in the application catalog 531 may be organized in a way similar to that of application catalog 202b, discussed above.

In many implementations, a data storage server 520 will contain one or more memory devices 523, at least one of which will be data storage 524. Data storage 524 may store user data, files, preferences, application data, and/or operating system data. In some implementations, memory devices 523 and data storage 524 may be similar to memory 122 and 128 discussed above.

Application delivery server 500 may comprise a virtual server, a cloud based dedicated server, a cloud based virtual server, or any other type and form of computing device. Application delivery server 500 may be any type of device 101 discussed above, and may comprise one or processors 304 (which may be similar to processors 103 discussed above); network interfaces 306 (which may be similar to communications interfaces 118 discussed above); and memory devices 308 (which may be similar to memory 122, 128 discussed above). Application delivery server 500 may include a prioritization engine 501, an application delivery engine 502, a notification delivery engine 503, an application repository 504, an application usage database 505, a user priority preference database 506, and/or a configuration database 507, which although shown on application delivery server 500 may be located on another device such as a data storage server 520 or may be distributed among multiple application delivery servers 500.

In some implementations, application delivery server 500 may have a prioritization engine 501. In many implementations, prioritization engine 501 will receive application usage history data, such as data collected by an application usage monitor 533. In some implementations, prioritization engine 501 may receive application usage history data from an application usage database 505. In some implementations, prioritization engine 501 may calculate priority, desirability, and/or likelihood that a user will request an application at a given time based on historic usage data such as some or all of the data elements collected by application usage monitor 533. This calculation may be performed by any appropriate means such as frequency of usage during certain time intervals, and may employ any appropriate techniques such as weighted averages, quartile ranges, mean, median, mode, standard deviation, percentiles, correlations, regressions, machine learning, or other algorithms or formulae. In some implementations, prioritization engine 501 may assign priority scores, relevance scores, and/or desirability scores to one or more applications. In some implementations, prioritization engine 501 may receive user preference data which may affect calculation of application priority scores, desirability, and/or other calculations pertaining to likelihood that a user will request an application at a given time. User preference data may be received from a user priority preference database 506. In some implementations, prioritization engine 501 may calculate priority scores at regular intervals or in response to certain events. Application priority scores may be stored in a database such as application usage database 505, on a data storage device such as data storage 524, or with user profile information, for example in a configuration database 507.

In some implementations, application delivery server 500 may have an application delivery engine 502. Application delivery engine 502 may retrieve application data from an application repository 504, which may store application binaries, scripts, and/or other application resources and/or data. In some implementations, application delivery engine 502 may load applications into memory responsive to a user request, a request from a client 530, information generated by a prioritization engine 501, and/or a request received from a prioritization engine 501. In some implementations, application delivery engine 502 may send application data over a network 510 to a client 530.

In some implementations, application delivery server 500 may have a notification delivery engine 503. Notification delivery engine 503 may receive notification data from an application delivery engine 502. In many implementations, a notification delivery engine 503 may parse, format, categorize, sort, group and/or optimize notification information, using means and/or methods similar to those discussed above in describing activity feed 302b. In some implementations, a notification delivery engine 503 may send notification data over a network 510 to a client 530.

In some implementations, application delivery server 500 may have a user priority preference database 506. User priority preference database 506 may store a plurality of user preference information. In some implementations, a user priority preference database 506 may store user preference information pertaining to notifications including preferences regarding notification grouping, sorting, desirability, timing, time periods, and/or relevance scores. This information may be provided manually by the user and/or determined dynamically and/or automatically by an agent or engine such as a notification delivery engine 503. A user priority preference database 506 may store user preference information pertaining to application usage preferences including information about application desirability, relevance, priority, time periods, relevance scores, priority scores, organization, and/or grouping.

In some implementations, application delivery server 500 may have a configuration database 507. Configuration database 507 may store user profile information. Configuration database 507 may store information such as what applications are available for each user of the system, whether each user has access rights to change various settings and/or preferences, and/or the settings data for each application a user uses such as language preferences, spell-check data, auto-login preferences, and/or password data.

FIG. 6 is a table depicting some of the information gathered about an application used by a user, according to some implementations. An application usage monitor 533 may collect a plurality of characteristics and data elements when a user uses an application. These may include a user ID 601, application ID 602, application type 603, open timestamp 604, close timestamp 605, time zone 606, running application list 607, and additional metadata 608.

A user ID 601 may consist of anything that identifies a user in a system. In some implementations a user ID 601 may consist of one or more of an integer, string, array, struct, dictionary, or binary file, and/or list. In many implementations, a user ID will consist of a username, domain/username combination, employee ID code and/or email address. A user ID 601 may be derived from a device ID, MAC address, or various device hardware signatures and/or unique identifiers.

An application ID 602 may consist of anything that identifies an application in a system. In some implementations an application ID 602 may consist of one or more of an integer, string, array, struct, dictionary, binary file, and/or list. In many implementations, an application ID 602 will consist of an application name, application version number, application hash, and/or identification data generated and/or assigned by an application delivery engine 502.

An application type 604 may consist of any information that categorizes or profiles an application. In some implementations, an application type 604 will consist of descriptive keywords pertain to the applications use, for example, email, word processing, or expense reporting. In many implementations, an application type 604 will consist of information pertaining to where the application is stored and how the application is loaded and/or presented to the end user on a client 530, for example, managed application, local application, web application, or micro application. In other implementations, an application type 605 will consist of information about how the application interacts with the system, including whether it accesses the internet, how much memory it uses, whether it stores a large amount of data, and/or whether it requires certain types of resources.

An open timestamp 604 may consist of any information indicating when an application was opened by or began being used by a user. It may consist of one or more of an integer, string, array, struct, dictionary, binary file, and/or list. It may be formatted according to UNIX timestamp formatting conventions or any other format that records the time and date. In some implementations, an open timestamp 604 may be derived from the time an application is first requested by a user, the time an application is fully displayed on a client 530, and/or the time an application request is received by an application delivery engine 502.

A close timestamp 605 may consist of any information indicating when an application was closed by or ceased being used by a user. It may consist of one or more of an integer, string, array, struct, dictionary, binary file, and/or list. It may be formatted according to UNIX timestamp formatting conventions or any other format that records the time and date. In some implementations, a close timestamp 605 may be derived from the time an application process is no longer running on a client 530, the time application data is no longer being sent from an application delivery engine 520, and/or the time a user sends a close command to an application (including, for example, clicking the close or X button on a graphical user interface, using a close gesture such as swiping, pinching, or tapping on a certain region of a touch screen with a graphical user interface, a KILL command, PKILL command, SIGTERM command, SIGNUP command, SIGINT command, and/or a SIGKILL command).

A time zone 606 may consist of any information indicating one of the world time zones. It may consist of one or more of an integer, string, array, struct, dictionary, binary file, and/or list. It may be specified in the format of GMT+/− offset or with an abbreviation. In many implementations, a time zone 606 will be derived from location in which the user is using the application. In some implementations, a time zone 606 may be derived from a system clock on a client 530, a setting in a user profile, a user preference, geolocation data, a setting in an application, and/or the location of an application delivery server 500.

A running application list 607 may consist of any information indicating some or all of the other applications running at the same time as the current application. It may consist of one or more of an integer, string, array, struct, dictionary, binary file, and/or list. In some implementations, it may consist of a list of processes running on a system and/or a list of applications requested from an application delivery engine 502. It may include profile data and/or other characteristics of applications running on the system. It may include information about the duration/runtime of the applications.

Additional metadata 608 may consist of any information about an application. It may consist of one or more of an integer, string, array, struct, dictionary, binary file, and/or list. In some implementations, additional metadata 608 may include header data, application signature, data pertaining to resource calls made by the application, data about encryption used by the application, and/or information sent and/or received by the application over the internet.

Figure 7:
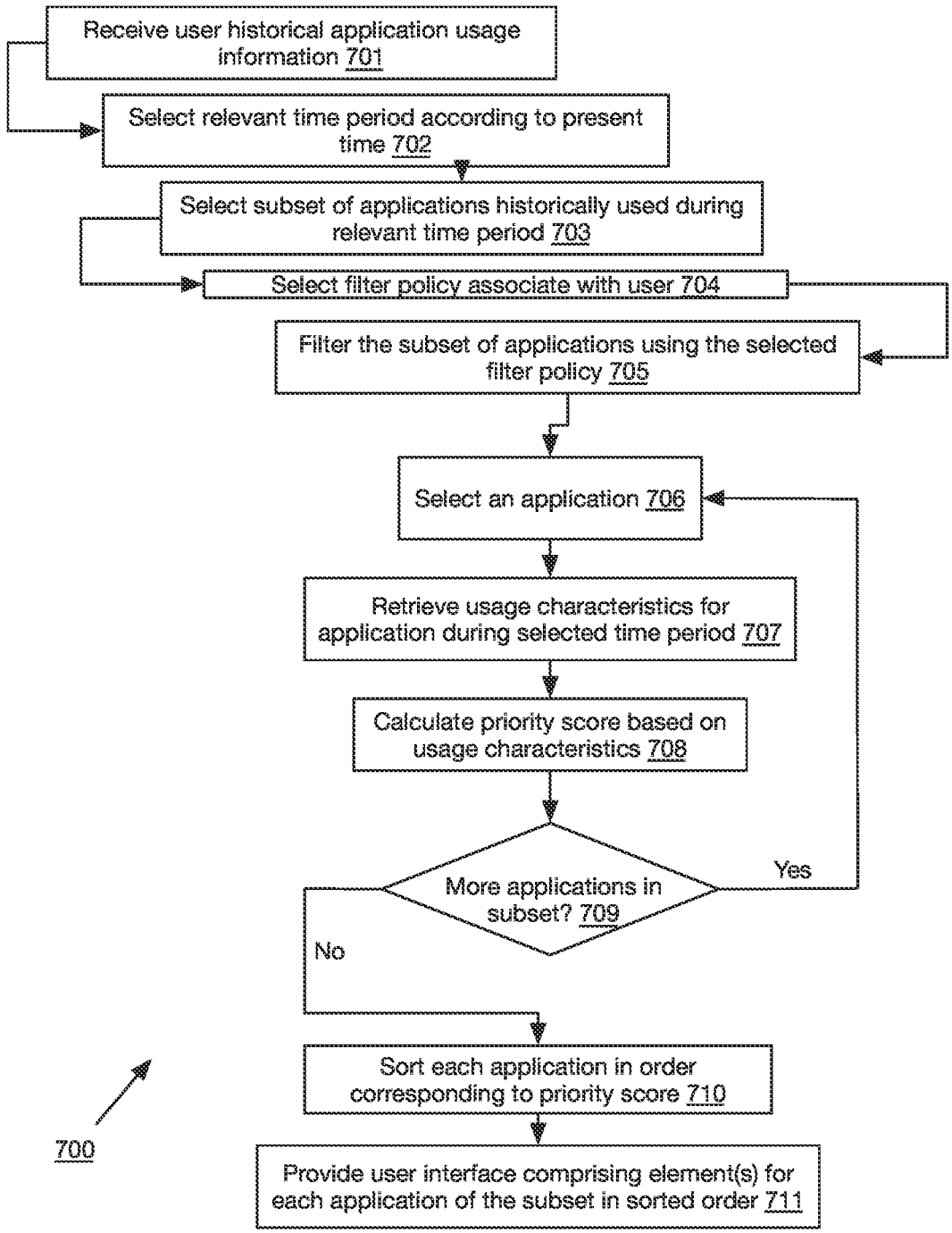
FIG. 7 is a flow chart of an implementation of a method for application sorting optimization.

FIG. 7 is a flow chart of an implementation of a method 700 for application sorting optimization. At step 701, an application delivery server 500 or an application prioritization engine 501 executed by or on an application delivery server 500 may receive user historical usage information. This information may be received from an application usage database 505. The information may be received via any suitable protocol, such as a RESTful request or API.

At step 702, the application delivery server or application prioritization engine may select a relevant time period according to the present time. In some implementations, a user may be able to define time period sizes, for example, periods of 30, 60, or 90 minutes. In other implementations, time period size may be determined automatically based on one or more of a variety of factors such as how long a user typically uses applications each day. In some implementations, the relevant time period may be determined by identifying the period which overlaps with the present time. In other implementations, the relevant time period may be determined by identifying the period which will begin after the period which overlaps with the present time. In some implementations, the relevant time period may be determined according to a schedule, calendar, or time interval. In a few implementations, the relevant time period may be determined responsive to an event or user preference.

At step 703, the application delivery server or application prioritization engine may select a subset of the applications that are historically used during the relevant time period. This subset may be determined according to the applications currently available to the user or according to a configuration or policy. In some implementations, the subset may be determined according to application categories. In a few implementations, the subset may be determined according to user preferences. In some implementations, the subset may be determined by excluding applications that run automatically and not in response to a user request for the application.

At step 704, the application delivery server or application prioritization engine may select a filter policy associated with a user. A filter policy may comprise a list of applications, application characteristics, or other algorithms, data, or formulae that can be used to identify applications. In some implementations, this filter policy may comprise a list of applications manually defined by a user or administrator. In many implementations, this filter policy will comprise a list of applications that that are not available via a virtualized or managed application delivery system such as an application delivery server 500, for example, applications that are stored on and run locally on a client 530.

At step 705, the application delivery server or application prioritization engine may filter the subset of applications using the selected filter policy. In some implementations, this may consist of checking for applications that match the filter policy and removing the matched applications from the subset of applications.

At step 706, the application delivery server or application prioritization engine may select an application from the filtered subset of applications. In some implementations, this may be accomplished by identifying a first application ID 602 of a first application for which a priority score has not yet been calculated in the filtered subset of applications.

At step 707, the application delivery server or application prioritization engine may retrieve usage characteristics for the selected application during the selected time period. In some implementations, this information may be retrieved from an application usage database 505. In many implementations, this information will include information about the characteristics gathered by an application usage monitor 533 about each selected application, such as whether the application was opened, for how long it was used, and frequency of use in past time periods corresponding to the selected time period.

At step 708, the application delivery server or application prioritization engine may calculate a priority score for the selected application based on usage characteristics. A priority score may be a determination of how likely it is that a user will request an application at a specific time or during a specific time period. In some implementations, this calculation may be performed by analyzing historical frequency of use during the selected relevant time period. In some implementations, this calculation may be modified according to user, system, or administrator preferences.

At step 709, in some implementations, the application delivery server or application prioritization engine may determine if there are more applications in the filtered subset of applications, for which a priority score has not yet been calculated. If it is determined that there are more applications in the filtered subset of applications, for which a priority score has not yet been calculated, the application delivery server or application prioritization engine may return to step 706. If it is determined that a priority score has been calculated for all of the applications in the filtered subset of applications, the application delivery server or application prioritization engine may proceed to step 710.

At step 710, the application delivery server or application prioritization engine may sort each application of the filtered subset of applications in order corresponding to the priority score calculated for each application. In many implementations, this will be accomplished by sorting the applications such that the application with the highest priority score is first and the remaining applications are organized according to their corresponding priority scores in decreasing order. Sorting may be accomplished by any appropriate means including, for example, bubble sort, merge sort, insertion sort, or selection sort.

At step 711, the application delivery server or application prioritization engine may provide a user interface comprising one or more elements for each application of the filtered subset of applications in sorted order. In some implementations, this may be accomplished by sending element data for each application of the filtered subset of applications across a network 510 to a client 530 where it is displayed as an application catalog 531.

Users waste time waiting for applications to load on their computer. Additionally, in virtualized or managed computing environments, network bottlenecks, server lag, and degradation of system performance can occur when many users request applications around the same time, such as the start of the business day or after a lunch break. Pre-loading applications for users while taking into account burden on system resources may reduce network bottlenecks, server lag, and degradation of system performance. It may also reduce time wasted by users waiting for applications to load and improve the overall user experience.

Figure 8:
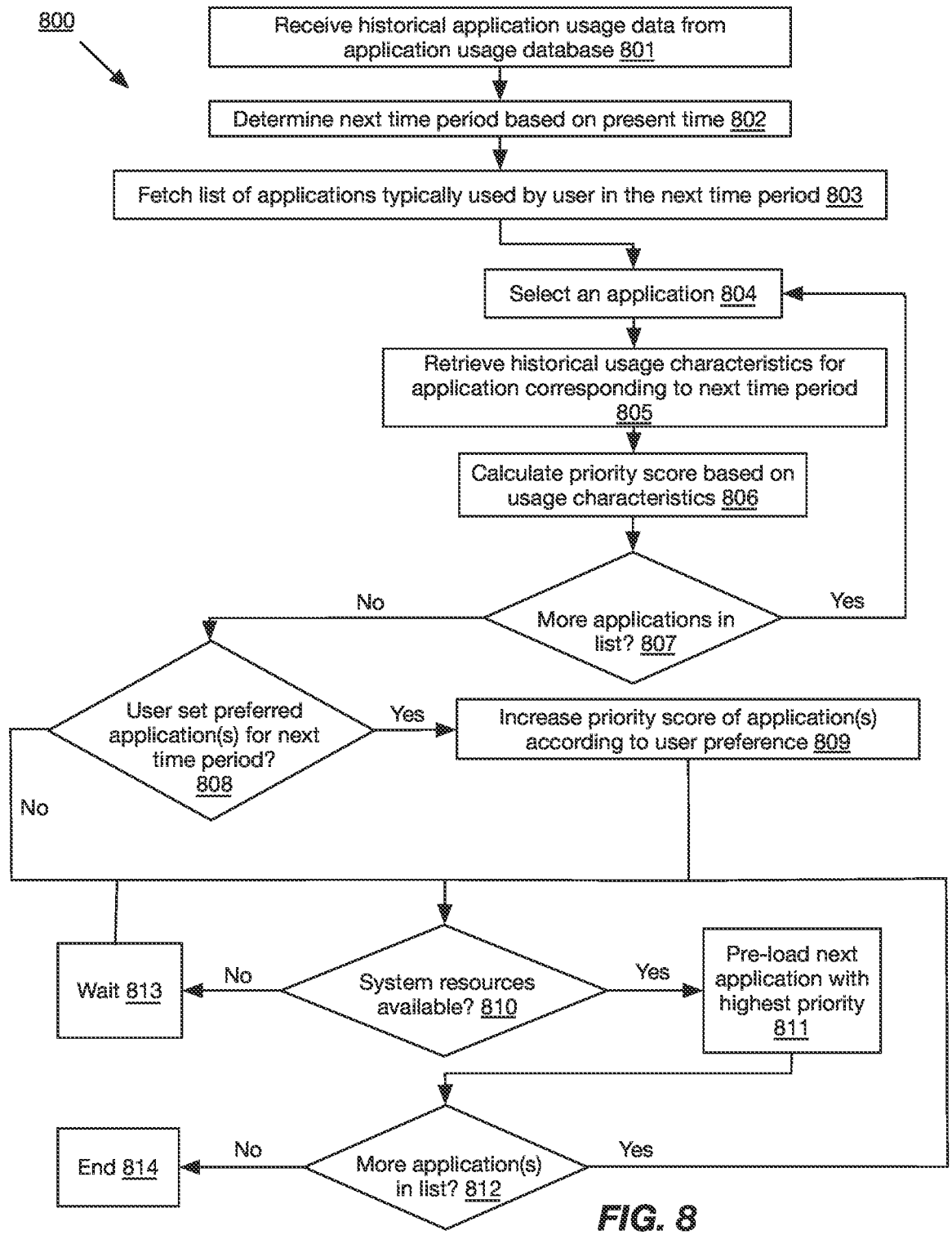
FIG. 8 is a flow chart of an implementation of a method for application delivery optimization.

FIG. 8 is a flow chart of an implementation of a method 800 for application delivery optimization. At step 801, an application delivery server 500 or an application prioritization engine 501 executed by or on an application delivery server 500 may receive historical application usage data from an application usage database 505. The information may be received via any suitable protocol, such as a RESTful request or API.

At step 802, the application delivery server or application prioritization engine may determine the next time period based on the present time. In some implementations, a user may be able to define time period sizes, for example, periods of 30, 60, or 90 minutes. In other implementations, time period size may be determined automatically based on one or more of a variety of factors such as how long a user typically uses applications each day. In some implementations, the next time period may be determined by identifying the period which overlaps with the present time. In other implementations, the next time period may be determined by identifying the period which will begin after the period which overlaps with the present time. In some implementations, the next time period may be determined according to a schedule, calendar, or time interval. In a few implementations, the next time period may be determined responsive to an event or user preference.

At step 803, the application delivery server or application prioritization engine may fetch a list of applications typically used by a user in the next time period. This list may be stored in an application usage database 505 or calculated based on historical application usage data. This list may be modified according to the applications currently available to the user or according to a configuration or policy. In some implementations, the list may be modified according to application categories. In a few implementations, the list may be modified according to user preferences. In some implementations, the list may be modified by excluding applications that run automatically and not in response to a user request for the application.

At step 804, the application delivery server or application prioritization engine may select an application from the list of applications typically used by the user in the next time period. In some implementations, this may be accomplished by identifying a first application ID 602 of a first application for which a priority score has not yet been calculated in the list of applications typically used by the user in the next time period.

At step 805, the application delivery server or application prioritization engine may retrieve historical usage characteristics for the selected application corresponding to the next time period. In some implementations, this information may be retrieved from an application usage database 505. In many implementations, this information will include information about the characteristics gathered by an application usage monitor 533 about each selected application, such as whether the application was opened, for how long it was used, and frequency of use in past time periods corresponding to the next time period.

At step 806, the application delivery server or application prioritization engine may calculate a priority score for the selected application based on historical usage characteristics. A priority score may be a determination of how likely it is that a user will request an application at a specific time or during a specific time period. In some implementations, this calculation may be performed by analyzing historical frequency of use during the selected relevant time period. In some implementations, this calculation may be modified according to user, system, or administrator preferences.

At step 807, in some implementations, the application delivery server or application prioritization engine may determine if there are more applications in the list of applications typically used by the user in the next time period, for which a priority score has not yet been calculated. If it is determined that there are more applications in the list of applications typically used by the user in the next time period, for which a priority score has not yet been calculated, the application delivery server or application prioritization engine may return to step 804. If it is determined that a priority score has been calculated for all of the applications in the list of applications typically used by the user in the next time period, the application delivery server or application prioritization engine may proceed to step 808.

At step 808, in some implementations, the application delivery server or application prioritization engine may determine if the user has set a preference or otherwise identified one or more applications as preferred applications for the next time period. If the application delivery server or application prioritization engine determines that the user has set such a preference or otherwise identified preferred applications for the next time period, at step 809, the application delivery server or application prioritization engine may increase the priority score for each application that the user identified as a preferred application. In some implementations, the user may be able to rank application preference. If ranked preferences are available and set by the user, at step 809, the application delivery server or application prioritization engine may increase the priority score for each application in amounts related to the ranking preferences set by the user. If the application delivery server or application prioritization engine determines that the user has set such a preference or otherwise identified preferred applications for the next time period, the application delivery server or application prioritization engine may proceed to step 810.

At step 810, in some implementations, the application delivery server or application prioritization engine may check if system resources are available to pre-load applications. In some implementations, this may be accomplished by sampling the current load on and/or utilization percentage of the CPU(s), checking usage of volatile memory, determining average I/O operations on the non-volatile memory, and/or checking a user application request queue. Determinations may be made according to a pre-defined policy or dynamically by monitoring and analyzing historical usage impact of pre-loading applications in a variety of system resource utilization states. If the application delivery server or application prioritization engine determines that sufficient system resources are available, at step 811, the application delivery server or application prioritization engine may pre-load the next application of the list of applications typically used by the user in the next time period with the highest priority score. In some implementations, pre-loading may be accomplished by loading the application binary, scripts, resources, data from databases, support scripts, and/or data from API calls into volatile memory in an application delivery engine 502. If the application delivery server or application prioritization engine determines that sufficient system resources are not available, at step 813, the application delivery server or application prioritization engine may wait for system resources to become available. In some implementations, the duration of the wait may be pre-set. In some implementations the duration of the wait may be determined by one or more characteristics of the current system resource utilization state.

At step 812, in some implementations, the application delivery server or application prioritization engine may check if there are more applications in the list of applications typically used by the user in the next time period and corresponding priority scores. If the application delivery server or application prioritization engine determines there are more applications in the list, the application delivery server or application prioritization engine may return to step 810. If the application delivery server or application prioritization engine determines there are no more applications in the list, at step 814, the application delivery server or application prioritization engine may cease operation of this instance of method 800.

In should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and that these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a hard disk, a CD-ROM, a flash memory card, a PROM, a RAM, a ROM, or a magnetic tape. In general, the computer-readable programs may be implemented in any programming language, such as LISP, PHP, PERL, PYTHON, C, C++, C #, PROLOG, or in any byte code languages such as JAVA. The software programs or executable instructions may be stored on or in one or more articles of manufacture as object code.

While the foregoing writing description of the methods and systems enable one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufactured using programmable and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMS, ROMs, PROMs, RAMs, SRAMs, etc.), hardware (e.g., integrated circuit chip, Field Programmable Gate Array (FPGA), Application Specified Integrated Circuit (ASIC), etc.), electronic devices, a computer readable non-volatile storage unit (e.g., CD-ROM, hard disk drive, etc.). The article of manufacture may be accessible from a file server providing access to the computer-readable programs via a network transmission line, wireless transmission media, signals propagating through space, radio waves, infrared signals, etc. The articles of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PHP PERL, PYTHON, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described method and systems. Thus, the scope of the methods and systems described herein should not be limited by any of the illustrative embodiments and should be defined in accordance with the accompanying claims and their equivalents.

What is claimed is:

1. A method for optimized application prioritization, comprising:
   receiving, by a computing device, historical usage information of a user of a plurality of applications, the historical usage information comprising a plurality of usage characteristics for each application of the plurality of applications;
   selecting, by the computing device, a subset of the plurality of applications according to a filter policy and a present time period;
   determining, by the computing device, a priority score for each application of the selected subset, the priority score for each application based on the plurality of usage characteristics for the corresponding application and the present time period;
   sorting, by the computing device, each application of the selected subset in order according to the corresponding priority score for the application; and
   providing, by the computing device, a user interface comprising one or more elements corresponding to each application of the selected subset in the sorted order.

2. The method of claim 1, wherein the plurality of usage characteristics comprise an average frequency of access of the corresponding application; an average duration of access of the corresponding application; and an average order of access of the corresponding application relative to other applications.

3. The method of claim 1, wherein the plurality of usage characteristics comprise usage characteristics for a predetermined time period corresponding to the present time period.

4. The method of claim 1, further comprising measuring the plurality of usage characteristics for an application by tracking, during access to the application, utilization of a processor and a memory device of a computing device associated with the user.

5. The method of claim 1, wherein selecting the subset of the plurality of applications further comprises excluding one or more applications of the plurality of applications from the subset, responsive to the filter policy indicating that the one or more applications are unavailable for access during the present time period.

6. The method of claim 1, further comprising launching a first application having a highest corresponding priority score of the scores of the applications of the selected subset, prior to receipt of a request to launch the first application from the user.

7. The method of claim 6, further comprising launching a second application having a second highest corresponding priority score of the scores of the applications of the selected subset, prior to receipt of a request to launch the first application from the user, the second application configured to execute at a lower priority than the first application.

8. The method of claim 1, wherein the one or more elements corresponding to each application comprise notifications.

9. A system for optimized application prioritization, comprising:
   a computing device comprising a memory device storing historical usage information of a user of a plurality of applications, the historical usage information comprising a plurality of usage characteristics for each application of the plurality of applications, and a processor executing an application prioritization service;
   wherein the application prioritization service is configured to:
      select a subset of the plurality of applications according to a filter policy and a present time period,
      determine a priority score for each application of the selected subset, the priority score for each application based on the plurality of usage characteristics for the corresponding application and the present time period,
      sort each application of the selected subset in order according to the corresponding priority score for the application, and
      provide a user interface comprising one or more elements corresponding to each application of the selected subset in the sorted order.

10. The system of claim 9, wherein the plurality of usage characteristics comprise an average frequency of access of the corresponding application; an average duration of access of the corresponding application; and an average order of access of the corresponding application relative to other applications.

11. The system of claim 9, wherein the plurality of usage characteristics comprise usage characteristics for a predetermined time period corresponding to the present time period.

12. The system of claim 9, wherein the application prioritization service is further configured to measure the plurality of usage characteristics for an application by tracking, during access to the application, utilization of a processor and a memory device of a computing device associated with the user.

13. The system of claim 9, wherein the application prioritization service is further configured to exclude one or more applications of the plurality of applications from the subset, responsive to the filter policy indicating that the one or more applications are unavailable for access during the present time period.

14. The system of claim 9, wherein the application prioritization service is further configured to launch a first application having a highest corresponding priority score of the scores of the applications of the selected subset, prior to receipt of a request to launch the first application from the user.

15. The system of claim 14, wherein the application prioritization service is further configured to launch a second application having a second highest corresponding priority score of the scores of the applications of the selected subset, prior to receipt of a request to launch the first application from the user, the second application configured to execute at a lower priority than the first application.

16. The system of claim 9, wherein the one or more elements corresponding to each application comprise notifications.

17. A non-transitory computer readable medium comprising instructions that, when executed by a processor of a computing device, cause the computing device to perform operations comprising:
   receiving historical usage information of a user of a plurality of applications, the historical usage information comprising a plurality of usage characteristics for each application of the plurality of applications;
   selecting a subset of the plurality of applications according to a filter policy and a present time period;
   determine a priority score for each application of the selected subset, the priority score for each application based on the plurality of usage characteristics for the corresponding application and the present time period;
   sorting each application of the selected subset in order based on the plurality of usage characteristics for the corresponding application and the present time period;
   providing a user interface comprising one or more elements corresponding to each application of the selected subset in the sorted order; and
   launch a first application having a highest corresponding priority score of the priority scores of the applications of the selected subset, prior to receipt of a request to launch the first application from the user.

* * * * *